Aug. 21, 1951 J. W. McKINLEY 2,565,143
MATERIAL SPREADER HAVING A VIBRATORY HOPPER BOTTOM
Filed March 29, 1946 2 Sheets-Sheet 1

Inventor:
James William McKinley.
by H. J. Sanders
Attorney.

Aug. 21, 1951      J. W. McKINLEY      2,565,143
MATERIAL SPREADER HAVING A VIBRATORY HOPPER BOTTOM
Filed March 29, 1946      2 Sheets-Sheet 2

Patented Aug. 21, 1951

2,565,143

UNITED STATES PATENT OFFICE 2,565,143

MATERIAL SPREADER HAVING A VIBRATORY HOPPER BOTTOM

James William McKinley, Monticello, Ill.

Application March 29, 1946, Serial No. 658,076

2 Claims. (Cl. 222—177)

This invention relates to improvements in agricultural implements and more particularly to a phosphate and limestone distributor or spreader. One object is to provide such a spreader adapted to distribute predetermined and variable quantities of lime and phosphate, or other materials, over a given area.

A further object is to provide a phosphate and lime spreader having novel means of agitation to insure proper vibration of the feeding mechanism with attendant efficient distribution and with a total absence of clogging of the material.

A still further object is to provide a phosphate and lime spreader of durable construction, compact in assembly, easy to handle and to adjust when necessary, and one that is inexpensive to manufacture.

With the foregoing and other objects in view which will appear as the description proceeds, the invention resides in the combination and arrangement of parts and in the details of construction hereinafter fully described and claimed, it being understood that changes in the particular embodiment of the present disclosure may be made within the scope of what is claimed without departing from the spirit of the invention.

In the accompanying drawings wherein like reference characters denote corresponding parts:

Figure 1:
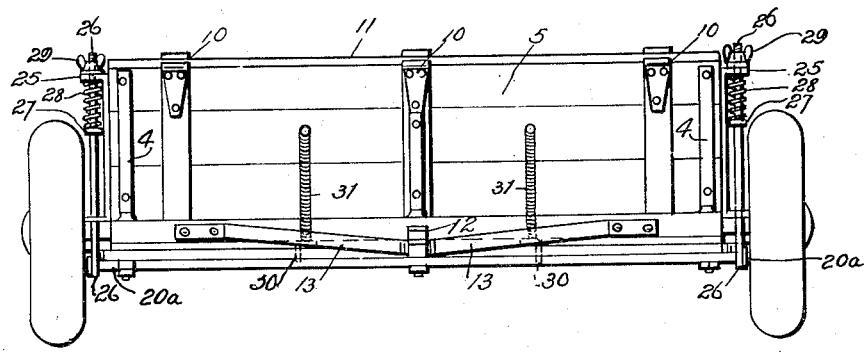
Fig. 1 is a front view of the spreader.
Figure 2:
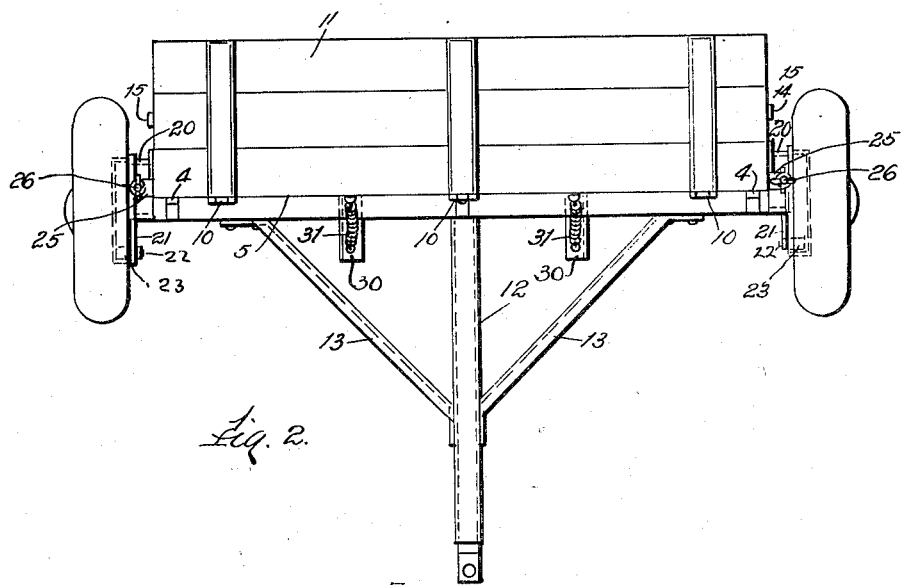
Fig. 2 is a top plan view of the same.

The reference numeral 1 denotes the axle of the spreader which is supported at its ends upon the wheels 2 having tires 3. Secured upon the axle by clamps 4 is the hopper having a vertical front wall 5, vertical narrowing end walls 6 and an inclined rear wall 7.

Figure 3:
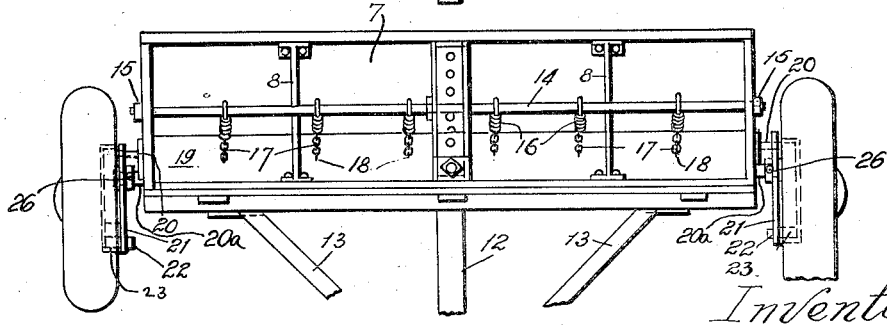
Fig. 3 is a horizontal cross sectional view, taken on the line 3—3 of Fig. 4, and, Fig. 4 is an enlarged vertical sectional view through the spreader.
Figure 4:
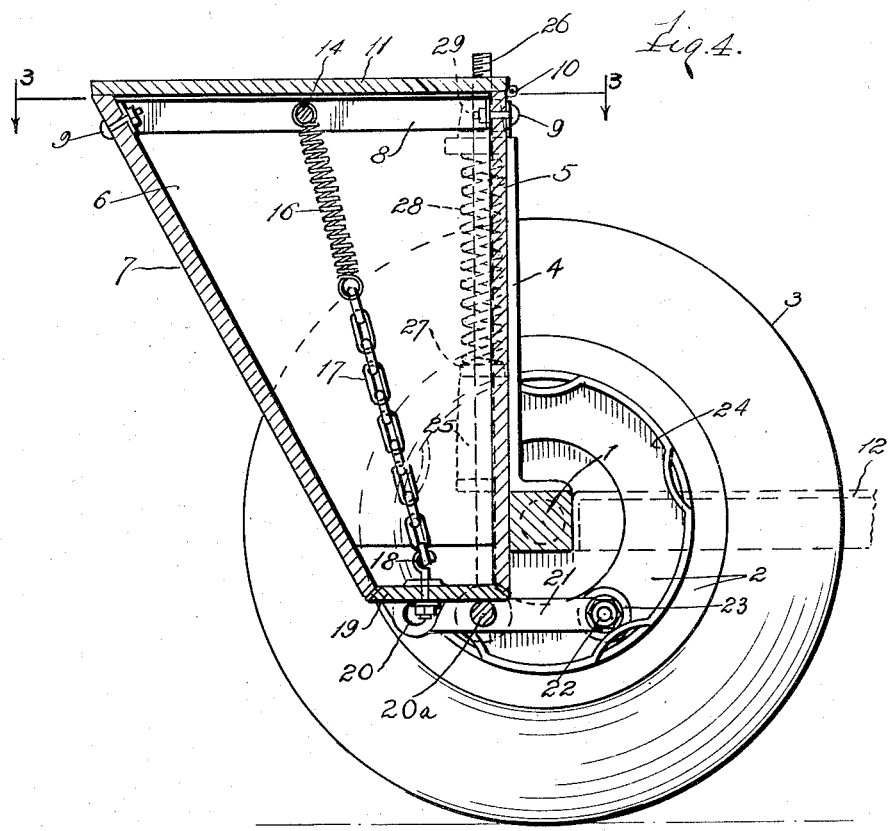

The walls 5, 7 are secured together at their upper edges by the bars 8 and bolts 9. Secured to the wall 5 by hinges 10 is the top or cover 11. Secured to the said axle is the draft bar 12 provided with the braces 13. Extending longitudinally of the hopper, at the mouth thereof, through the several bars 8 and through end walls 6 is the stout support rod 14 held in position at its ends by the nuts 15. Secured at one end to said rod 14 are contractile coil springs 16, their opposite ends being connected to chains 17 that at their lower ends are secured to hooks 18 that extend through and are fast to the false or floating bottom 19 that almost closes the opening at the lower end of the hopper, being spaced slightly from the lower ends of the several hopper walls. The said springs, chains and hooks are arranged in sets, six sets being clearly shown in Fig. 3, although this number may be varied if desired, each set being composed of a resilient and non-resilient members.

Secured to the ends of the bottom 19 and extending outwardly therefrom are the pins 20, 20a to which the links 21 are secured to which the shanks 22 of rollers 23 are made fast, said rollers riding over the cam runway 24 built in the inner face of each wheel 2, said links 21 fulcrumed to pins 20a. The weight of the bottom 19 and material within the hopper is borne mainly by said rollers 23 upon the cam runways and movement of said rollers in their travel is imparted as vibration or vertical oscillation to said bottom.

Secured to the outer faces of said end walls are the brackets 25 having right angled ends through which extend the pitmans 26 that at their lower ends are made fast to the pins 20a, each pitman having a lug 27 thereon substantially midway between ends of brackets 25 and about said pitmans between lugs 27 and the adjacent bracket ends the expansion coil springs 28 are arranged to yieldingly retain said pitmans in normal position, said pitmans being provided at their upper ends with adjusting nuts 29 for increasing or diminishing the tension of springs 28, said pitmans, springs and connections serving as adjusting means whereby the floating bottom may be yieldingly spaced as desired from the hopper, and secured to stub arms 30 fast to and extending forwardly from said bottom are the stout contractile springs 31 providing additional resilient support for the said bottom.

In operation the phosphate and limestone, or other material, are introduced into the hopper partially or completely filling same all about the sets of springs, chains and hooks, the weight of the contents being borne by the walls and bottom of the hopper and by the supports for the bottom, which include the rollers in their runways. As the vehicle is propelled over the ground the rollers, through their connections to said bottom, impart a substantially regular vibratory movement to same, varying the size of the space between said bottom and the side and end walls of the hopper, thus thoroughly agitating the contents thereof and causing same to be distributed or spread upon the ground in uniform manner, depositing a predetermined quantity over a given area.

What is claimed is:

1. In a fertilizer spreader including a wheeled hopper, a floating bottom for said hopper yieldingly spaced a predetermined distance from the lower terminations of the hopper walls, cam runways built in said wheels, pins secured to said floating bottom and extending outwardly therebeyond, links each fulcrumed to one of said pins adjacent said runways and engaging a second pin, rollers travelling over said runways having shanks carried by said links, and resilient agitating means connecting said floating bottom to the hopper walls and extending through said hopper to the mouth thereof.

2. In a fertilizer spreader, a hopper having a straight front wall and an inclined rear wall, bars connecting said walls together at their upper edges, a support rod carried by said bars, a floating bottom for said hopper separate from said walls, chain and spring connection between said support rod and said floating bottom yieldingly retaining said floating bottom in slight spaced relation to the lower ends of said walls, supporting wheels for said hopper, cam runways in said wheels, links carried by said floating bottom, and rollers carried by said links riding over said cam runways.

JAMES WILLIAM McKINLEY.

REFERENCES CITED

The following references are of record in the file of this patent:

UNITED STATES PATENTS

| Number | Name | Date |
|---|---|---|
| 339,023 | Sherwood et al. | Mar. 30, 1886 |
| 605,002 | Motley | May 31, 1898 |
| 1,516,954 | Cole | Nov. 25, 1924 |
| 1,903,836 | Ray | Apr. 18, 1933 |
| 2,322,171 | Spatz | June 15, 1943 |

FOREIGN PATENTS

| Number | Country | Date |
|---|---|---|
| 468,368 | Germany | Nov. 12, 1928 |